United States Patent [19]

Hamada

[11] 4,104,624
[45] Aug. 1, 1978

[54] MICROPROCESSOR CONTROLLED CRT DISPLAY SYSTEM

[75] Inventor: Nagaharu Hamada, Hitachi, Japan

[73] Assignee: Hitachi, Ltd., Japan

[21] Appl. No.: 754,997

[22] Filed: Dec. 28, 1976

[30] Foreign Application Priority Data

Dec. 29, 1975 [JP] Japan .............................. 50-158480

[51] Int. Cl.² .............................................. G06F 3/14
[52] U.S. Cl. ............................ 340/324 AD; 340/154
[58] Field of Search ..... 340/324 A, 324 AD, 152-154

[56] References Cited

U.S. PATENT DOCUMENTS

| 3,656,148 | 4/1972 | Belcher et al. ...................... 340/154 |
| 3,676,850 | 7/1972 | Goldman et al. .................... 340/154 |
| 3,742,482 | 6/1973 | Albrecht et al. ..................... 340/154 |

FOREIGN PATENT DOCUMENTS 1,183,427  3/1970  United Kingdom.
1,045,929  10/1966  United Kingdom.

OTHER PUBLICATIONS

Cost Effective, Reliable CRT Terminal...; Doub; Hewlett-Packard Journal; vol. 26, #10; pp. 2-5.
A Functionally Modular Logic System for CRT Terminal; Lane; Hewlett-Packard Journal; vol. 26, #10, pp. 6-10.
High Resolution Raster Scan Display; Roy; Hewlett-Packard Journal; vol. 26, #10; pp. 11-15.

Primary Examiner—Marshall M. Curtis
Attorney, Agent, or Firm—Craig & Antonelli

[57] ABSTRACT

A display system is disclosed wherein a refresh memory is divided into a plurality of blocks of bytes so that a micro-processor can access the blocks byte by byte while display data of the plurality of blocks are assembled by word so that the display data are accessed word by word. The access by the micro-processor and the access for display are time-shared at a timing of one half of one character display to avoid wait time for the accessing.

4 Claims, 3 Drawing Figures

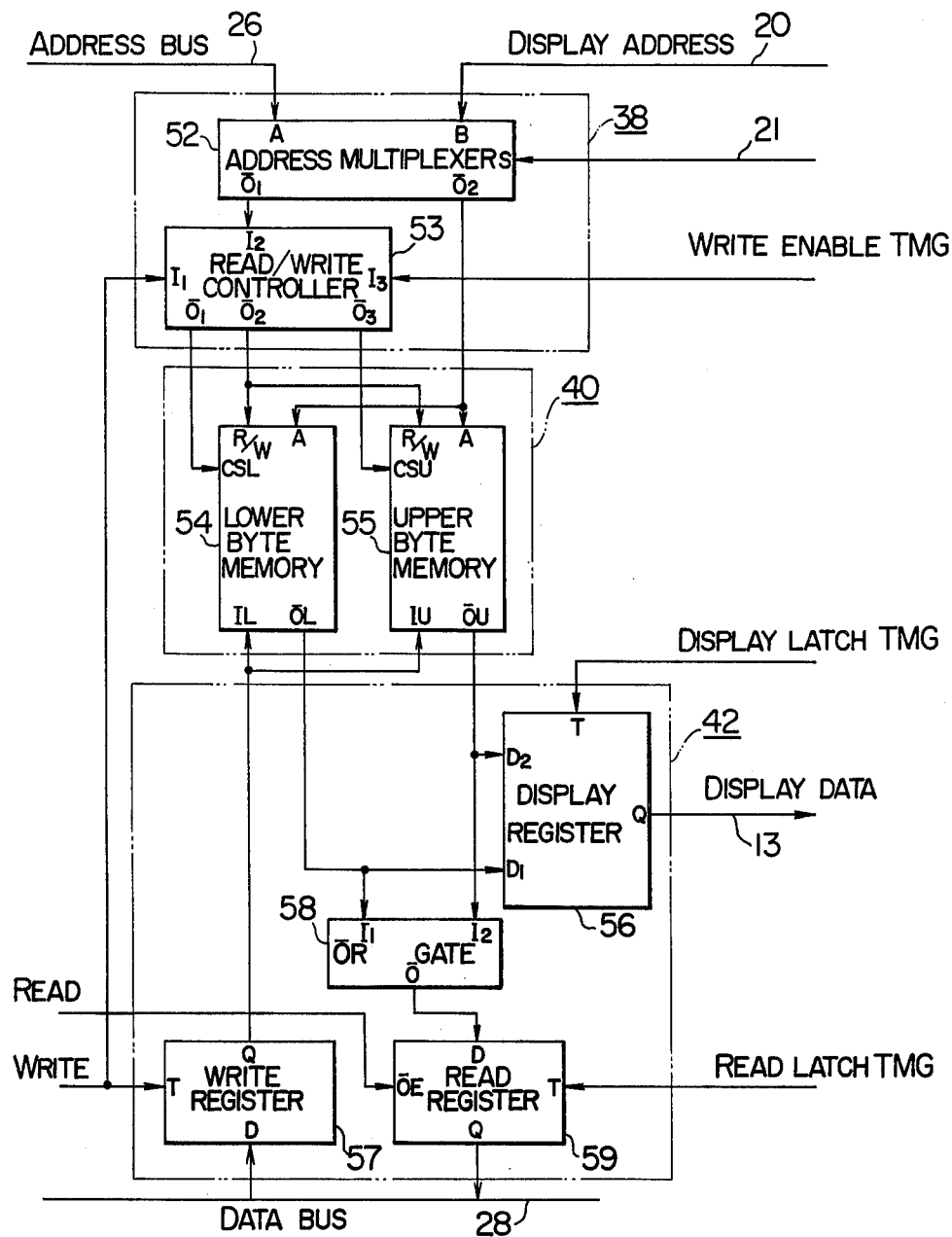

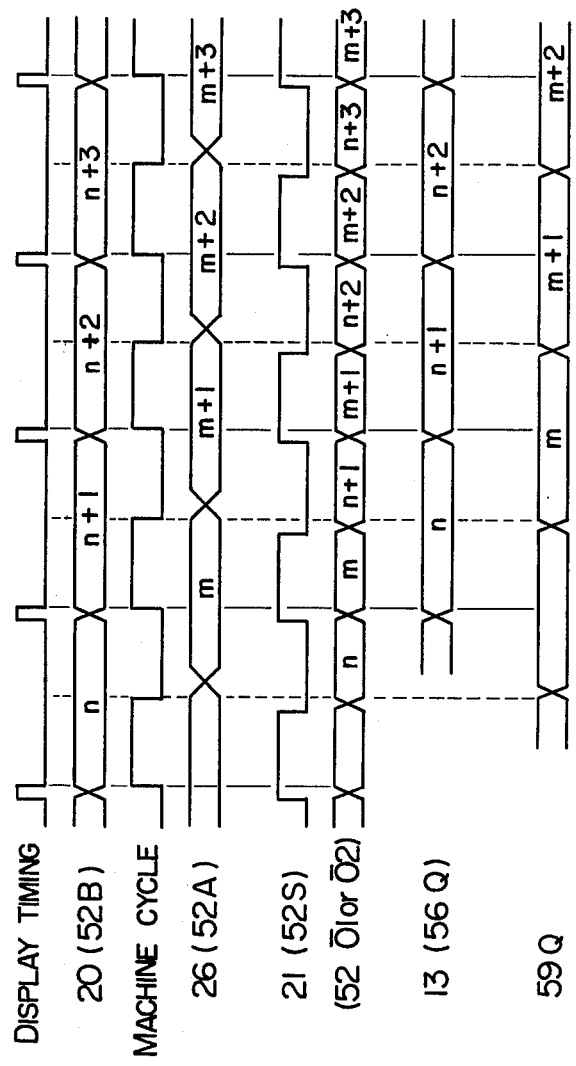

MICROPROCESSOR CONTROLLED CRT DISPLAY SYSTEM

BACKGROUND OF THE INVENTION

1. Field of the Invention

The present invention relates to a display system suitable for use with a digital computer, and more particularly to a display system with a data structure which is suited to be microprogram-controlled.

2. Description of the Prior Art

As disclosed in "A high-resolution raster scan display" by Jean Clande Roy. Hewlett-Pakard Journal Vol. 26, No. 10, pp 11 – 15, for example, a common construction of the display system comprises a data control unit for controlling the exchange of data with an external data source, such as a digital computer or a keyboard, a refresh memory for storing display data, a timing control unit for controlling the input/output timing as well as the display timing, a video control unit for generating a video signal for display based on the display data and the display timing, and a viewer for displaying the video signal as a visible image.

It is the control function of the data control unit and the video control unit which has the primary influence on the function of the entire display system. With a recent trend of increased intelligence included in the data processing and the complexity of the display function, the control function of those units is becoming more and more important with the attendant increase in the amount of hardware in the control units. As an approach to overcome the above problem it has been proposed to enhance the flexibility of processing and reduce the amount of hardware by a microprogram control which uses a recently developed one-chip CPU (micro-processor), as is disclosed in "Micro-processors in CRT terminal applications: Hardware/Software" by Michael T. Gray. Computor Oct. 1975 pp 53 – 59, for example.

A data structure for conventional display systems employing a microprogram control has been constructed such that the data control unit, the refresh memory unit and the timing control unit are connected to a common address bus and a common data bus, and the data control unit has been usually constructed mainly by a microprocessor and a microprogram memory. The refresh memory usually stores a screen of data and the exchange of data with an external data source is carried out under the control of the micro-processor and the microprogram memory.

For display, the data at a selected address are is read out in synchronism with the scan rate of the viewer under the control of the timing control unit. In order to facilitate the efficient use of the micro-processor, a line buffer is usually provided so that a line of display data is transferred from the refresh memory to the line buffer in a direct memory access (DMA) mode during the line spacing and the input/output control for the refresh memory is carried out while the line of data of the line buffer is being displayed.

In the display system of the type described above, if the micro-processor is byte-oriented (e.g. 8-bit byte), the format for the display data must be also byte-oriented because of the common data bus. Accordingly, the freedom of the display and the restriction the entry region is low and the versatility of the function is poor. Furthermore, while the data is being transferred from the refresh memory to the line buffer under the DMA mode, the micro-processor cannot access the refresh memory, resulting in a low efficiency of data processing. In addition, additional hardware for the line buffer and a DMA timing generation circuit are necessary.

SUMMARY OF THE INVENTION

It is an object of the present invention to provide a display system which allows a micro-processor to access a refresh memory at any time.

It is another object of the present invention to provide a display system which permits the readout of display data by two bytes at a time even when a micro-processor is byte-oriented.

It is a further object of the present invention to provide a display system which requires less hardware.

One feature of the present invention resides in the fact that the refresh memory is divided into a plurality of blocks of bytes so that the micro-processor can access the blocks byte by byte while the display data of a plurality of blocks are assembled by word so that the display data are is accessed word by word.

Another feature of the present invention resides in the fact that the access by the micro-processor and the access for display are time-shared for a period equal to one half of one character display to avoid the wait time for the accessing.

BRIEF DESCRIPTION OF THE DRAWINGS

FIG. 2 is a block diagram illustrating an embodiment of a refresh memory to which the present invention is applied.

FIG. 3 is a timing chart for explaining the operation of the present invention.

DETAILED DESCRIPTION OF THE PREFERRED EMBODIMENTS

Figure 1:
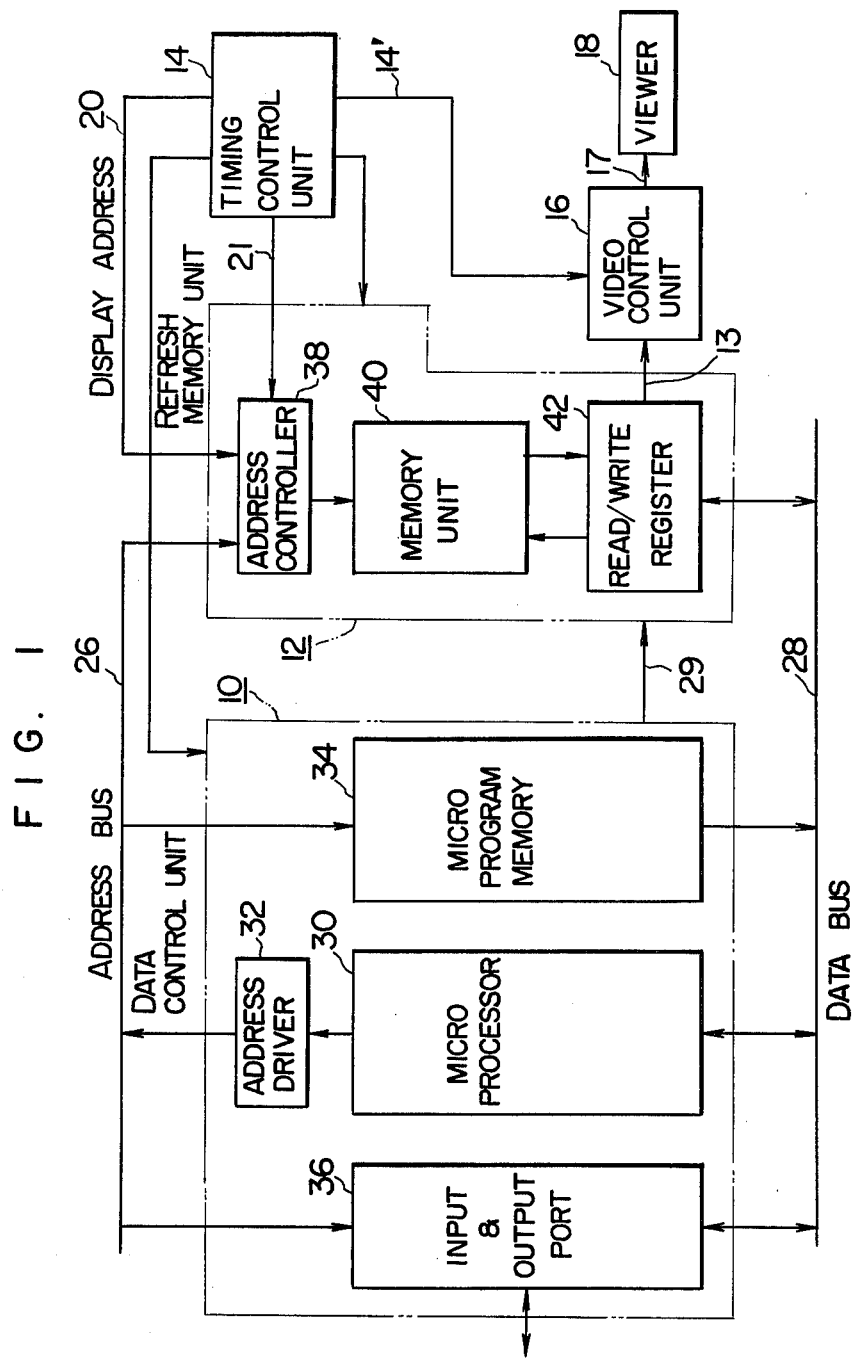
FIG. 1 shows an overall configuration of a data structure of a display terminal to which the present invention is applied.

FIG. 1 shows an overall configuration of the structure of a data display terminal to which the present invention is applied. Basically, it comprises a data control unit 10, a refresh memory unit 12, a timing control unit 14, a video control unit 16 and a viewer 18.

The data control unit 10 includes a micro-processor 30, an address driver 32, a microprogram memory 34 and an input/output port 36, and it is coupled to the refresh memory unit 12 through an address bus 26, a data bus 28 and a control signal bus 29. The micro-processor 30 accesses the microprogram memory 34 through the address driver 32 and the address bus 26 and reads the content thereof through the data bus 28 to execute the operation designated by the program. Namely, it controls the exchange of display data between an external data source and the refresh memory 12 through the input/output port 36, or modifies the data arrangement in the refresh memory unit 12 in response to a control command from the external data source.

The refresh memory unit 12 comprises an address controller 38, a memory unit 40 and a read/write register 42. It is accessed by the data control unit 10 as well as the timing control unit 14 so that the display data stored in the memory unit 40 are is repeatedly read out during a fixed period. The timing control unit 14 generates all timing signals required for the operations of the data control unit 10, the refresh memory unit 12 and the video control unit 16. The video control unit responds to display data 13 from the refresh memory unit 12 and a raster number 14' from the timing control unit 14 to produce a video signal 17 to be displayed on that raster. The viewer 18 responds to a video signal 17 to display a visual image on a CRT screen.

FIG. 2 shows a block diagram of the refresh memory unit 12 to which the present invention is applied. In FIG. 2, the address controller 38 comprises an address multiplexor 52 which selects the address bus 26 and the display address 20, and a read/write controller 53 for controlling the read/write of the memory unit 40.

The read/write register 42 comprises a display register 56 for latching the display data, a write register 57 for latching write data, an OR gate 58 for ORing read data, and a read register 59 for latching the read data. The memory unit 40 has byte-oriented blocks comprising a lower byte memory 54 which constitutes a lower byte of the display data and an upper byte memory 55 which constitutes an upper byte of the display data. The address multiplexor 52 has its one input terminal A connected to the data bus 26 and the other input terminal B connected to the display address 20. Connected to a selection terminal S thereof is an address selection signal 21 supplied from the timing control unit 14. The address selection signal 21 preferably occurs at the timing equal to one half of the one character display period so that the access from the address bus 26 is enabled during the earlier half of the one character display period while the access from the display address 20 is enabled during later half period.

More particularly, referring to FIG. 3, the timing of the one character display is selected to be in complete synchronism with a machine cycle of the micro-processor 30, and the display address 20 and the address bus 26 are selected under the control of the selection terminal S of the address multiplexor 52 such that outputs $O_1$ and $O_2$ are time-shared at one-half character timing. The outputs of the address multiplexor 52 are divided into two groups, terminals $O_1$ and $O_2$. The upper two bits of the address bus 26 or the display address 20 appear at the terminal $O_1$ while the lower two bits appear at the terminal $O_2$. The upper two bits determine the access mode of the memory unit 40. For example, it is convenient to establish operation such that (0, 0) represents no access, (0, 1) represents access to only the lower byte, (1, 0) represents access to only the upper byte, and (1, 1) represents access to both upper and lower bytes. The two-bit output $O_1$ is connected to a terminal $I_2$ of the read/write controller 53 to determine the access mode in the manner described above. The write signal from the data control unit 10 is applied to an input terminal $I_1$ of the read/write controller 53 and a write enable timing signal from the timing control unit 14 is applied to the other input terminal $I_3$. The read/write controller 53 has three output terminals $O_1$, $O_2$ and $O_3$ which are connected to a chip select terminal (CSL) of the lower byte memory 54, the read/write terminals of the lower byte memory 54 and the upper byte memory 55 and a chip select terminal CSU of the upper byte memory 55, respectively. In this way, the read/write controller 53 operates to supply a chip select signal and a read/write signal to a selected memory block depending on the conditions of the input terminals $I_1$, $I_2$ and $I_3$.

An input terminal D of the write register 57 is connected to the data bus 28 while an output terminal Q thereof is connected in common to input terminals IL and IU of the lower byte memory 54 and the upper byte memory 55, respectively.

The memory access from the micro-processor 30 is carried out in the following manner. During the write operation from the data control unit 10, the write signal from the data control unit 10 is activated so that the content of the data bus 28 is read into the write register 57. Then, when the address bus 26 is selected by the address multiplexor 52, the data are written at the selected address of the memory under the control of the write enable timing.

The OR gate 58 has its one input terminal $I_1$ connected to an output OL of the lower byte memory 54 and the other input terminal $I_2$ connected to an output OU of the upper byte memory 55. An output O of the OR gate 58 is connected to the input terminal D of the read register 59 which is latched in response to a read latch timing signal supplied at a trigger terminal T thereof from the timing control unit 14.

During the read operation by the data control unit 10, the write signal from the data control unit 10 is deactivated so that the address controller 38 supplies a read address to a selected memory block when the address multiplexor 52 selects the address bus 26. In this way, the data at the selected memory address is read out and temporarily stored in the read register 59 by the read latch timing. Thereafter, in response to a read instruction signal from the data control unit 10, it is read into the micro-processor 30 via the data bus 28.

The output terminal OL of the lower byte memory 54 and the output terminal OU of the upper byte memory 55 are connected to the input terminals $D_1$ and $D_2$, respectively, of the display register 56, a trigger terminal T of which receives a display latch timing signal from the timing control unit 14. The memory access for display is carried out in the following manner. When the display address 20 is selected by the address multiplexor 52 of the address controller 38, the lower byte memory 54 and the upper byte memory 55 are accessed simultaneously and the two bytes are simultaneously latched in the display register 56 by the display latch timing signal. The display data latched in the display register 56 is converted to a video signal 17 by the video control unit 16 for display by the viewer 18.

FIG. 3 is a timing chart for explaining the operation of the present invention. The display address 20 is successively renewed as $n$, $n + 1$, . . . in synchronism with the timing equal to one character display period. The address bus 26, through which the micro-processor 30 accesses the refresh memory 12, is successively renewed as $m$, $m + 1$, . . . when the timing of the one character display is selected to be in complete synchronism with a machine cycle of the micro-processor 30, as shown in FIG. 3.

In this state, when the selection terminal 52S of the address multiplexer 38 is controlled as shown in FIG. 3, the contents of the display address 20 and the address bus 26 alternatively appear at the output thereof (52 $O_1$ or 52 $O_2$) so that the memory unit 40 is accessed on a time-shared basis at one-half character display timing from both the display address 20 and the micro-processor 30. Namely, the memory unit 40 is accessed word by word for $n$ of the display address 20 to latch the read-out data in the display register 56 at a display latch timing in synchronism with the one character display timing so that the display data 13 are renewed as $n$, $n + 1$, . . . at the one character display timing.

Further, for example, if the micro-processor 30 is performing a read operation, the read-out data of the upper byte or the lower byte are latched in the read register 59 at the read latching timing of one-half character out-of-timing with the display data 13 so that the output of the read register 59 is renewed as m, m + 1, ... at the timing one-half out-of-phase with the display timing as shown in FIG. 3.

As described hereinabove, according to the preferred embodiment of the present invention, the refresh memory is divided into a plurality of blocks of bytes so that the micro-processor can access the blocks byte by byte while the display data of a plurality of blocks are assembled by word so that the display data are accessed word by word. Furthermore, the access by the micro-processor and the access for display are time-shared at a timing equal to one half of one character display period so that no wait time is needed for both accesses. Thus, the throughput is improved. In addition, even when the data formats for the micro-processor and the display are different from each other, the versatility of the display is enhanced with the increase of the bit length since dual access is permitted. Moreover, since the line buffer and the DMA timing generation circuit which were required in the conventional system are no longer necessary, the amount of hardware is reduced, accordingly achieving cost reduction and high reliability.

I claim:

1. A display system comprising:
    a refresh memory unit having a memory unit in which at least a screen of display data is divided into a plurality of memory blocks each consisting of a byte;
    a data control unit for microprogram-controlling byte-by-byte exchange of the data between said memory unit and an external data source;
    a timing control unit for controlling the timing of the data exhange and display;
    an address controller provided in said refresh memory unit for selectively controlling the access to said memory unit by said data control unit to access a memory block and the access to said memory unit by said timing control unit to simultaneously access a plurality of memory blocks;
    a video control unit for generating a video signal for display based on the display data in which one character is represented by a plurality of bytes and the display timing signal; and
    a viewer for displaying the video signal on a CRT screen as a visible image.

2. A display system according to claim 1 wherein the access to said memory unit by said data control unit and the access by said timing control unit are repeated at a timing equal to one half of one character display period.

3. A display system according to claim 1 wherein;
    said data control unit includes a micro-processor, an address driver, a microprogram memory and an input/output port, and is coupled to the refresh memory unit through an address bus, a data bus and a control signal bus;
    said refresh memory unit includes said address controller, said memory unit and a read/write register, and carries out the data exchange one byte at a time for the access by said data control unit and supplies the display data a plurality of bytes at a time for the access by the timing control unit;
    said timing control unit including means for generating timing signals required for the operations of said data control unit, said refresh memory unit and said video control unit;
    said video control unit being responsive to the display data from said refresh memory unit and a raster number from said timing control unit to produce a video signal to be displayed on that raster; and
    said viewer being responsive to said video signal to display the visible image on the CRT screen.

4. A display system according to claim 3 wherein said refresh memory unit comprises:
    an address controller having said address multiplexor for selecting one of the address bus and the display address and a read/write controller for controlling the read/write operation of the memory unit;
    a read/write register having a display register for latching the display data;
    a write register for latching the write data, an OR gate for ORing the read data and a read register for latching the read data, and
    said memory unit having a byte-oriented memory block including a lower byte memory which constitutes a lower byte of the display data and an upper byte memory which constitutes an upper byte of the display data.

* * * * *